United States Patent [19]

Lenzer et al.

[11] Patent Number: 4,619,410
[45] Date of Patent: Oct. 28, 1986

[54] FIELD CHOPPER

[75] Inventors: Xaver Lenzer, Kötz; Eberhard Wistuba, Rettenbach; Hermann Mödinger, Kissendorf, all of Fed. Rep. of Germany

[73] Assignee: Karl Mengele & Söhne GmbH & Co. KG., Günzburg, Fed. Rep. of Germany

[21] Appl. No.: 727,586

[22] Filed: Apr. 26, 1985

[30] Foreign Application Priority Data

Apr. 26, 1984 [DE] Fed. Rep. of Germany ....... 3415508

[51] Int. Cl.⁴ ............................................. B02C 18/22
[52] U.S. Cl. .................................. 241/55; 241/79.1; 241/158; 241/222
[58] Field of Search ............... 241/222, 55, 56, 223, 241/224, 101.7, 241, 152 A, 285 R, 285 A, 285 B, 186 R, 79.1, 158

[56] References Cited

U.S. PATENT DOCUMENTS 1,776,593  9/1930  Meyer ..................... 241/152 A X

FOREIGN PATENT DOCUMENTS 0058431  8/1982  European Pat. Off. .
2098617  3/1972  France ............................. 241/222
2455852  12/1980  France .
984486  12/1982  U.S.S.R. ........................... 241/186 R Primary Examiner—Mark Rosenbaum
Attorney, Agent, or Firm—Toren, McGeady, Stanger, Goldberg & Kiel

[57] ABSTRACT

In a field chopper or chopper forage harvester, a disc wheel chopper is mounted within a housing for rotation about an axis with an elongated discharge tube opening from the radially outer surface of the housing. A crushing device is located within the discharge tube and is positioned to receive the material carried along the circumferentially inner surface of the housing by the disc wheel. The discharge tube forms an air transport duct located radially inwardly of the crushing device relative to the axis of the disc wheel chopper so that air flow generated by the disc wheel bypasses the crushing device and flows through the air transport duct for supporting the flow of material exiting from the crushing device.

6 Claims, 4 Drawing Figures

FIELD CHOPPER

BACKGROUND OF THE INVENTION

A field chopper or chopper forage harvester includes a comminution apparatus formed by a disc wheel chopper and at least one crushing device located downstream of the disc wheel chopper. The crushing device may be formed by at least one grinding and crushing roller cooperating with a fixed counterbase or at least two cooperating grinding and crushing rollers rotating in opposite directions.

A number of field choppers of this type are already known, note French Pat. No. 2 455 852 and No. E-OS 0 058 431, in which the comminution apparatus consists of a cylinder or drum chopper. The crushing device is located in a part of the cylinder housing positioned downwardly from a counterknife cooperating with the cylinder or drum. The material chopped by the cutting knives is moved downwardly along the circumferentially extending inner surface of the housing into the crushing device. Since separation of the chopped material is not effected over the short distance between the counterknife and the crushing device, the heavier particles do not move outwardly relative to the remainder of the material and the entire chopped material is accumulated at the opening into the crushing device and, as a result, it can be easily overloaded. The chopped material which is not accepted into the crushing device is accumulated in the path of the knives or blades on the cylinder and is conveyed directly into the discharge outlet without passing through the crushing device. As a result, a large part of the corn is not crushed and remains in its original chopped size. In the crushing device, on the other hand, the lighter and mostly fibrous chopped material components impede the crushing of the corn because of the resilience of such material. Relative to the chopping cylinder, since the crushing rollers have a much smaller diameter and, accordingly, a lower circumferential velocity, the lighter particles also interfere with the continued transport of the crushed material requiring additional transporting means, such as the blower used in the first patent mentioned above and the conveying worm employed in the second patent.

SUMMARY OF THE INVENTION

Therefore, the primary object of the present invention is to provide a field chopper of the type mentioned above so that additional transporting means for the crushed material, which are connected to the crushing device and are, therefore, costly in the terms of the device and the drive, are unnecessary.

In accordance with the present invention, a known disc wheel chopper serves as the field chopper and has a discharge outlet tube forming a continuation of the radially outer surface of the housing enclosing the disc wheel chopper. A crushing device is provided in the discharge outlet tube for crushing material flowing along the inside surface of the radially outer part of the housing. In addition, a transport duct is included in the discharge outlet tube radially closer to the axis of the housing so that the air flow produced by the blades on the disc wheel chopper is bypassed around the crushing device. The air flow transport duct includes an additional air guide plate at its outlet end.

The device according to the present invention has the following surprising advantages:

(a) A certain separating action takes place due to centrifugal action and wall friction over the relatively long conveying path from the counterknife along the inner surface of the circumferential wall of the housing to the discharge tube where the crushing device is located. During the separating action, the heavier particles remain along the inside surface of the circumferential wall and pass into the discharge tube at the radially outer side thereof relative to the axis of the disc wheel within the housing. The air flow generated by the disc wheel carries the lighter particles radially inwardly from the heavier particles so that mainly only the heavier particles are introduced into the crushing device whereby only the heavier corn components are crushed while the lighter material and air bypass the crushing device within the discharge tube.

(b) The transport duct formed within the discharge duct has a reduced cross-section in the outward direction provided by the guiding walls forming the transport duct. As a result, the velocity of the air flow developed within the disc wheel chopper is greatly accelerated so that it exceeds the velocity of the particles exiting from the crushing device. Since the particles from the crushing device are now much lighter due to their reduction in size, the air flow velocity substantially supports the continued flow of the crushed material.

(c) The crushing device can be switched off in a simple operation so that the chopper is utilizable for a variety of chopping operations.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
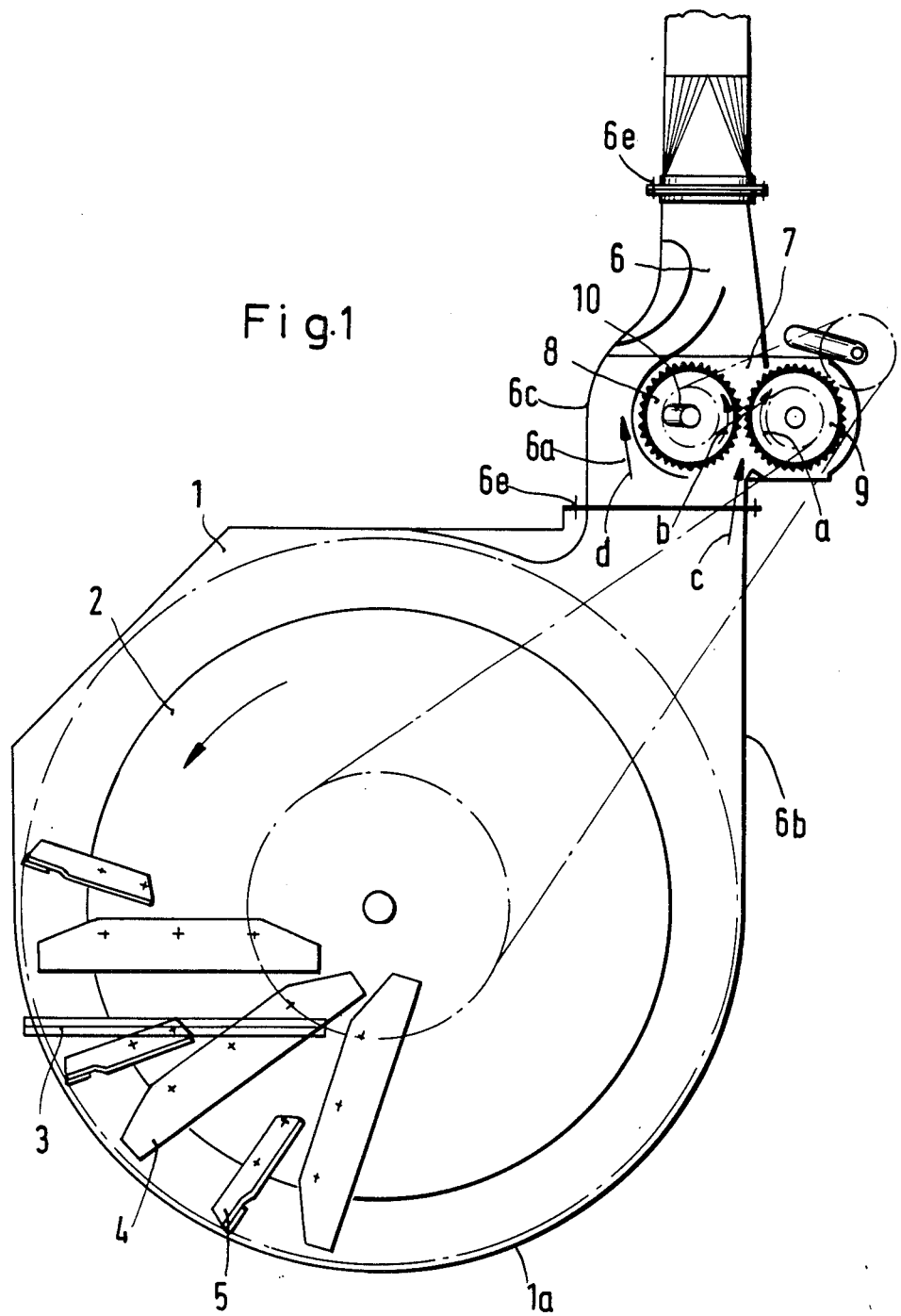
FIG. 1 is a schematic illustration of a disc wheel chopper as viewed from the side and the inlet apparatus is not shown.
Figure 2:
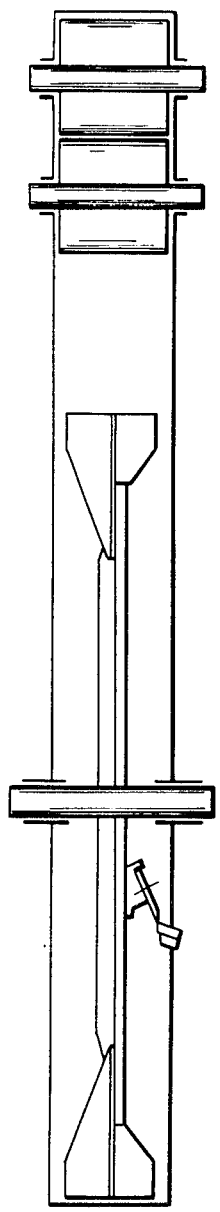
FIG. 2 is an elevational view taken at 90° relative to the view in FIG. 1.
Figure 3:
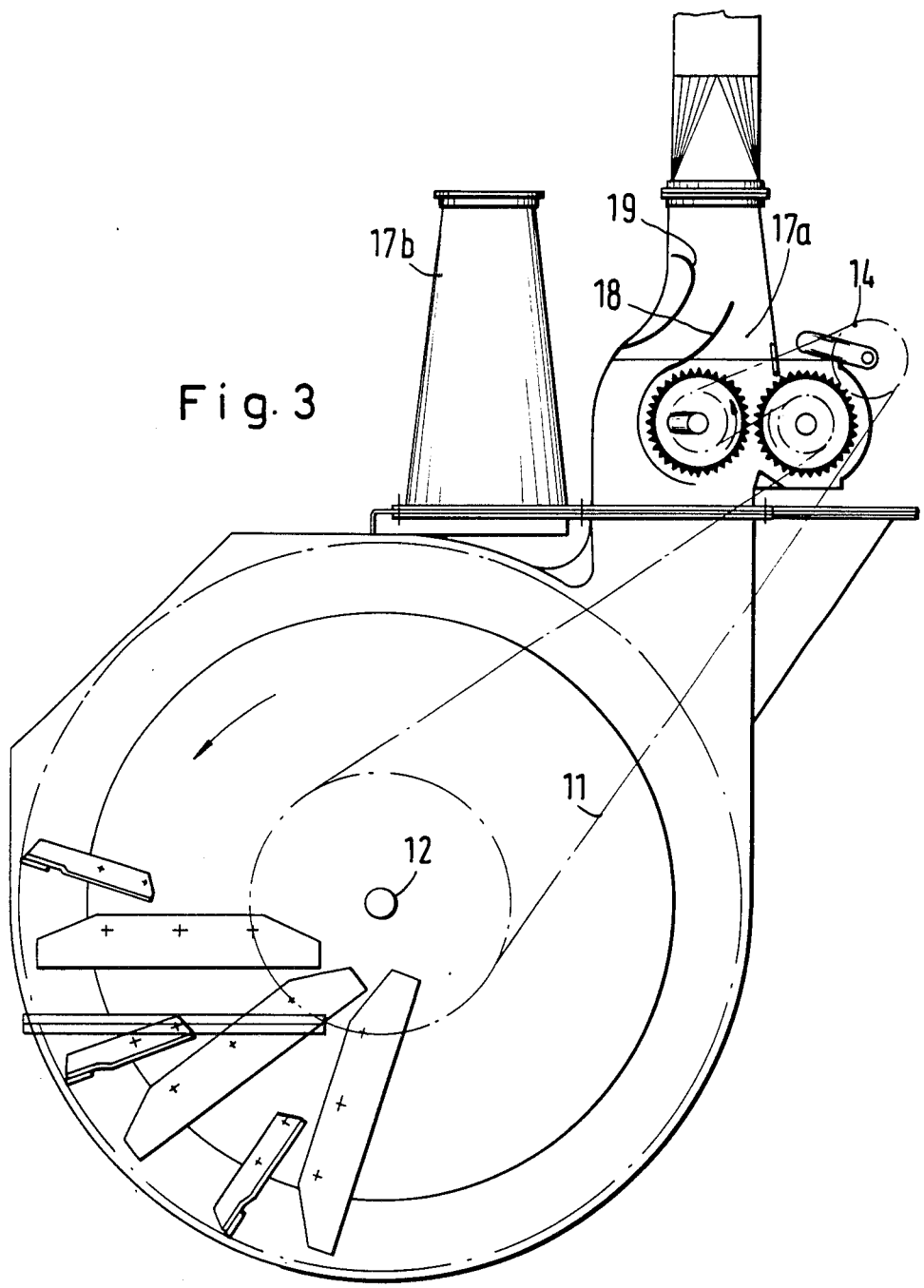
FIG. 3 is a view similar to FIG. 1, illustrating another embodiment of the present invention.

In the drawing, a housing 1 encloses a disc wheel 2 rotatable about an axis centrally located within the housing as viewed in FIGS. 1 and 3. A circumferentially extending wall 1a defines the retaining surface of the housing around the radially outer edge of the disc wheel 2. The disc wheel is provided with alternating knives 4 and blades 5 extending generally radially relative to the wheel axis. Though not shown, the material to be chopped, such as corn, is introduced into the housing 1 so that it flows downwardly in the upper left-hand quadrant of the housing as viewed in FIG. 1. Below the horizontal plane within the housing containing the disc wheel axis, a counterknife 3 is located for cooperating with the knives 4 for chopping the material delivered into the housing. The direction of the rotation of the disc wheel 2 is shown by the arrow so that it rotates counterclockwise in FIG. 1 with the material being cut as it passes downwardly along the inside surface of the circumferentially extending wall 1a with the blades 5 carrying the material along the inside surface. In the upper right-hand quadrant of the housing 1, as shown in FIG. 1, a discharge or outlet tube 6 extends upwardly from the housing and the cross-section of the discharge tube adjacent the circumferential wall 1a of the housing has a section 6a radially more remote from the axis of the disc wheel and aligned with the tube side 6b which forms a continuation of the wall 1a of the housing. The tube side or wall extends tangentially relative to the circumferential wall 1a. In the section 6a there is a crushing device 7. In the embodiment of FIG. 1, the crushing device 7 is formed by a pair of crushing rollers 8, 9 which rotate in opposite directions, note the arrows a and b. Arrow c indicates the intake gap for material moving between the two crushing rollers 8, 9. The tube side 6b is generally aligned with the gap c, as a result, the material passing along the inside surface of the circumferential wall 1a flows along the inside surface of the tube side or wall 6b and enters into the gap c. The remainder of section in the discharge tube 6 alongside the crushing device 7 forms an open space defining a transport duct, note arrow d, located between the crushing device 7 and the opposite tube side or wall 6c from the tube side or wall 6b. The air flow developed by the blades 5 rotating within the housing bypasses the crushing device 7 and flows through the duct d. Adjacent the crushing device 7, a plate forms one side of the air transport duct d. Above the crushing device 7, as viewed in FIG. 1, an inwardly directed baffle member limits the flow cross-section of the transport duct.

Figure 4:
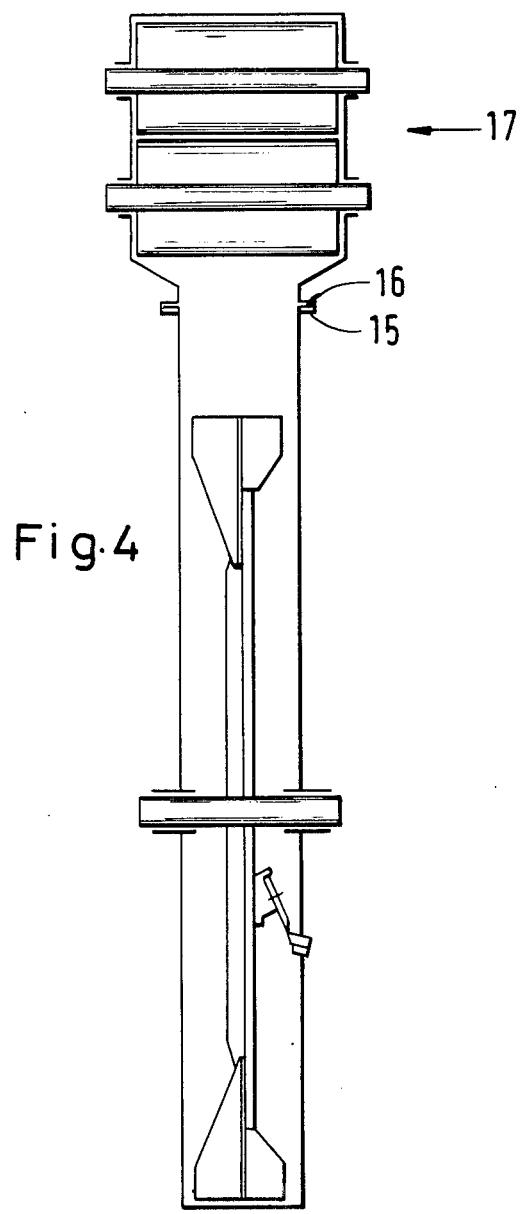
FIG. 4 is a view of the device illustrated in FIG. 3 and similar to the view shown in FIG. 2.

The crushing roller 8 is displaceably mounted in slots 10 and can be displaced to the left as viewed in FIG. 1 moving toward the transport duct d. The discharge tube section 6a containing the crushing device 7 can be easily disassembled at any time after opening the flange sections 6e so that the field chopper can be easily reset for other harvesting work. For example, if the crushing roller 8 would interfere with the operation of the chopper in the position shown in FIG. 1, it can be displaced through the slot 10 into a non-interfering position. In FIG. 3, a member 17, note FIG. 4, is displaceable in guides 15 by means of sliding parts 16. The member 17 includes a first part 17a containing the crushing device 7 formed by the crushing rollers 8, 9 and a second section 17b which forms a regular discharge tube continuation from the housing 1. This arrangement can be used for changing over between normal field chopper operation and the combination of the chopping operation and the crushing operation. Within the discharge tube 6, an air guide plate 18 is provided extending around the crushing roller 8 and forming a reduced cross-sectional area for the duct d located laterally of the crushing device. Further, a baffle or plate 19 is located above the crushing device forming one side of the air transport duct d for limiting the cross-sectional area of the duct as it extends upwardly through the discharge tube 6. Crushing rollers 8, 9 are driven by a V-belt gear unit 11 connected to the disc wheel shaft wheel 12. A belt tensioning device 14 is associated with the unit 11.

The chopping/crushing mechanism operates in the following manner: The harvested material, such as corn plants, is introduced into the housing 1 so that it flows downwardly and is chopped up by the knives 4 and the counterknife 3. After the chopping action, the material is carried by the blades 5 and guided first downwardly along the inside surface of the circumferential wall 1a of the housing and then is carried upwardly along the inside surface of the wall 1a into the enlarged discharge tube 6 where the crushing action take place. The centrifugal force generated by the rotation of the disc wheel 2 and the carrying action of the blades 5 causes the heavier particles of the chopped material, that is, the heavier corn components, to move radially outwardly toward the inside surface of the retaining wall and then to move along the tube wall 6b upwardly into the discharge tube 6. Accordingly, a certain amount of separation takes place with the heavier particles located radially outwardly relative to the lighter particles which are carried along by the air flow developed by the disc wheel 2 and its blades 5. As a result, the predominant portion of the chopped material arriving at take intake gap c in the crushing device 7 is formed of the heavier corn components and the crushing process is not blocked by the mass of lighter and more resilient plant parts, that is, the husks and stem parts, which mass is larger, per se. The air flow is accelerated as it flows in the bypass transport duct d less remote from the tube wall 6b and the reduction in cross-section of the transport duct d afforded by the air guide plates 18 and the plate or baffle 19 is directed upwardly through the discharge tube 6 at an acute angle relative to the axis of the discharge tube 6. The increased velocity of the air flow caused by the reduction in cross-section of the transport duct affords the continuous upward movement of the now much lighter particles ejected from the crushing device 7. Accordingly, as viewed in FIGS. 1 and 3, the gap c is located radially more remote from the axis of the housing than the transport duct d whereby the heavier materials flow through the gap c and are crushed and the lighter materials and air flow pass through the duct d and are accelerated and aid in carrying the crushed material upwardly through and out of the discharge duct 6.

While specific embodiments of the invention have been shown and described in detail to illustrate the application of the inventive principles, it will be understood that the invention may be embodied otherwise without departing from such principles.

We claim:

1. Field chopper comprising a comminution apparatus including a disc wheel chopper rotatable about an axis, and means for crushing the material chopped by the disc wheel chopper whereby the crushing means is located downstream of the chopped material flow through the disc wheel chopper, wherein the improvement comprises a housing, said disc wheel chopper located within said housing and including a disc wheel rotatably mounted in said housing about the axis of said chopper, said chopper axis being arranged horizontally, said housing having a circumferential wall extending around the horizontal axis of said chopper and defining a surface within said housing radially remote from and encircling the axis of said chopper, means on said disc wheel for carrying material chopped by said disc wheel chopper along the inside surface of said circumferential wall and moving the chopped material in a circumferentially extending flow direction, an elongated discharge tube extending upwardly and outwardly from the circumferential wall of said housing and having an entrance at the circumferential wall of said housing for receiving material thrown outwardly by the rotational action of said disc wheel chopper and said means thereon for carrying material, said discharge tube having a flow direction therethrough extending upwardly and outwardly from said housing and forming a first section having a cross-section transversely of the flow direction and extending outwardly from the circumferential wall of said housing with said first section having a first wall and an opposite second wall spaced from said first wall and extending outwardly in the flow direction of said discharge tube from the circumferential wall of said housing, the cross-section of said first section having a first part and a second part each extending in the flow direction of said discharge tube with the first part extending from said first wall toward said second wall and said second part extending from said second wall to said first part intermediate the first and second walls, said second wall being located downstream from said first wall in the rotational direction of said disc wheel chopper, said crushing means located within said first part of the first section of said discharge tube outwardly from the circumferential wall of said housing for receiving a heavier component of the chopped material thrown outwardly by said disc wheel chopper through the entrance into said discharge tube, said second part of said first section of said discharge tube forming a duct for receiving a lighter component of the chopped material and an air flow generated by said carrying means on said disc wheel chopper with said duct formed by said second part having a decreasing flow cross-sectional area in the direction outwardly from said housing for accelerating the air flow therethrough around said crushing means, and said discharge tube having a second section extending outwardly in the flow direction therethrough from said first section.

2. Field chopper, as set forth in claim 1, wherein an air guide plate is located within said discharge tube separating said first part and second part of said first section of said discharge tube and extending around said crushing device for separating said crushing device from said duct, and a member located within said duct downstream from the location of said crushing device for reducing thec cross-sectional area of said duct.

3. Field chopper, as set forth in claim 1, wherein said first and second sections of said discharge tube being arranged to be disassembled for affording access to said crushing device for adjusting said crushing device.

4. Field chopper, as set forth in claim 1, wherein said discharge tube comprises a first discharge tube containing said crushing device and said first section and a second discharge tube spaced from said first discharge tube defining a free discharge flow path, guide means for slidably supporting said first and second discharge tubes on said housing so that selectively one of said first or second discharge tubes can be aligned on said housing for receiving the discharge flow therefrom.

5. Field chopper, as set forth in claim 1, wherein said crushing device forming a gap in general alignment with said first wall, said crushing device comprising a pair of rollers with one of said rollers located closer to said second wall than the other said roller, an air guide plate located within said discharge tube extending around the one said roller and between the one said roller and said second wall, said second wall and said air guide plate forming at least in part the lateral boundaries of said air flow duct, and the end of said air guide plate spaced outwardly from the opening from said housing into said discharge duct arranged approximately parallel to said first wall of said discharge tube.

6. Field chopper, as set forth in claim 1, wherein said crushing device comprises a pair of crushing rollers with the axes of said rollers extending generally parallel with the axis of said disc wheel chopper, and the axial length of said disc wheel chopper within said housing being less than the axial length of said crushing rollers within said discharge tube.

* * * * *